(No Model.)

P. McINTYRE.
APPARATUS FOR MOLDING PERFORATED BLOCKS.

No. 368,409. Patented Aug. 16, 1887.

WITNESSES:
John A. Ellis
C. Sedgwick

INVENTOR:
P. McIntyre
BY Munn & Co.
ATTORNEYS.

N. PETERS, Photo-Lithographer, Washington, D. C.

UNITED STATES PATENT OFFICE.

PETER McINTYRE, OF NEW YORK, N. Y.

APPARATUS FOR MOLDING PERFORATED BLOCKS.

SPECIFICATION forming part of Letters Patent No. 368,409, dated August 16, 1887.

Application filed October 14, 1886. Serial No. 216,297. (No model.)

*To all whom it may concern:*

Be it known that I, PETER MCINTYRE, of the city, county, and State of New York, have invented a new and Improved Apparatus for Molding and Perforating Blocks or Sections of Plastic Material, of which the following is a full, clear, and exact description.

The object of my invention is to provide a practical apparatus for molding plastic material—such as clay, asphaltum, cement, or similar material—into blocks or sections and perforating the same to form several passages through the block or section; and to this end my invention consists, principally, of a machine or apparatus provided with a reciprocating follower carrying several penetrating-points arranged to be thrust through a molding-box provided with apertures, and adapted to be secured to the frame of the apparatus in line with the penetrating-points.

The invention also consists of the construction, arrangement, and combination of parts, all as hereinafter described.

Reference is to be had to the accompanying drawings, forming a part of this specification, in which similar letters of reference indicate corresponding parts in all the figures.

Figure 1:
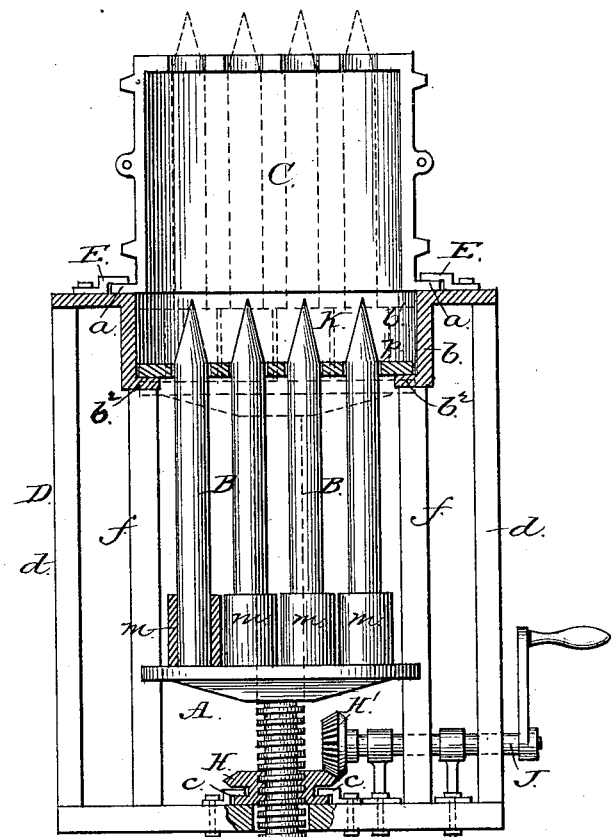
Figure 2:
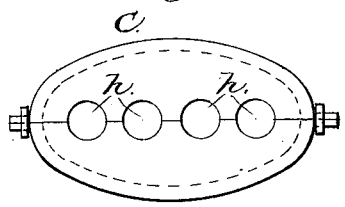
Figure 2:
Figure 3:
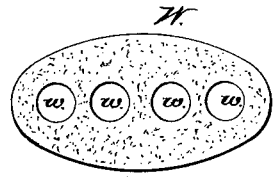

Figure 1 is a sectional elevation of my new and improved apparatus for molding and perforating blocks of plastic material, the mold being shown in place upon the frame of the machine. Fig. 2 is a plan view of the mold removed; and Fig. 3 is an end view of one of the completed blocks or sections, showing the passages therein.

A represents the follower, provided in this instance with four penetrating-points, B, adapted to be thrust through the molding-box C, held to the upper end of the main frame D by the cleats or buttons E E, engaging with the flange $a$ of the molding-box. The main frame D is composed of the bottom plate, F, side bars, $d\ d$, and intermediate guide-bars, $f\ f$, to the upper end of which and the side bars, $d$, is secured the hollow casting $b$, which is formed with the cavity $b'$, with which the cavity of the mold C coincides when in place upon the machine, as shown in Fig. 1. The follower A is operated by the heavy screw A', to which the follower is attached, and which is operated by an internally screw-threaded beveled gear, H, which is placed upon the screw and held to the plate F by the keepers $c\ c$, and adapted to be revolved by the crank-shaft J and beveled pinion H', secured thereon, which meshes with the operating screw-gear H, so that by turning the shaft J the follower may be raised to the position shown in dotted lines and lowered to that shown in full lines. The edges of the follower A are notched to engage with the guide-bars $f$, which guide the follower in its up-and-down movement. The bottom of the hollow casting $b$ is formed with the flange $b^2$, and in this casting is placed the plate K, which is formed with apertures $p$, through which the penetrating-points B pass, and this plate normally rests upon the flange $b^2$, which acts as a stop to the plate to prevent it from dropping too low in the machine.

Upon the penetrating-points B are formed or placed the hubs or collars $m$, which, when the follower is raised to force the penetrating-points through the molding-box, serve to lift the plate K to compress the material in the molding-box. While the molding-box may be made in any desired form, I prefer to make it elliptical in cross-section to form the elliptical block or section W, and I prefer to make the molding-box in two halves to be locked together by bolts and projections at the meeting edges of the castings, and at the closed end of the mold are formed the holes $h\ h$, through which the penetrating-points B pass when passed through the box to form the passages $w$ in the molded block or section.

In operation the molding-box C is taken from the machine and filled with the plastic material, and then placed upon the casting $b$ and secured. Then the shaft J is revolved, which will turn the screw-gear H and raise the screw A', follower A, and penetrating-points B, causing the latter to penetrate the plastic material in the mold, forming the passages $w$. When the collars $m$ reach the plate K, this will be lifted in the hollow casting $b$, and will compress the plastic material in the mold. The shaft J will then be reversed and the follower and penetrating-points and the plate K returned to their original position and the mold taken off and the section or block removed and the operation repeated.

In this manner the section may be very rapidly and practically made.

Having thus fully described my invention, what I claim as new, and desire to secure by Letters Patent, is—

1. The hollow casting $b$, provided with the apertured plate K, in combination with the molding-box C, follower A, penetrating-points B, collars $m$, and means, substantially as described, for reciprocating the follower and penetrating-points, substantially as described.

2. The main frame D, provided with the hollow casting $b$, guides $f$, screw-gear H, shaft J, and pinion H′, in combination with the follower A, screw A′, penetrating-points B, collars $m$, apertured plate K, and molding-box C, having apertures in its closed end, substantially as described.

PETER McINTYRE.

Witnesses:
H. A. WEST,
EDGAR TATE.